United States Patent [19]
Wang

[11] Patent Number: 5,718,439
[45] Date of Patent: Feb. 17, 1998

[54] STROLLER WITH DETACHABLE SEAT MEMBER

[76] Inventor: Frank Wang, No. 2, Lane 31, Ta-Wu St., Tainan City, Taiwan

[21] Appl. No.: 656,439

[22] Filed: May 31, 1996

[51] Int. Cl.⁶ ......................................... B62B 7/00
[52] U.S. Cl. ........................ 280/47.38; 280/47.39; 280/47.4; 297/256.1
[58] Field of Search ..................... 280/47.38, 47.39, 280/47.4, 642, 644, 650, 658; 297/130, 255, 256.1, 256.16

[56] References Cited

U.S. PATENT DOCUMENTS 5,028,061  7/1991  Hawkes .................. 280/642 X
5,201,535  4/1993  Kato et al. .............. 280/650 X
5,417,450  5/1995  Wang ...................... 280/642

Primary Examiner—Robert J. Oberleitner
Assistant Examiner—Pamela J. Lipka
Attorney, Agent, or Firm—Wells, St. John, Roberts, Gregory & Matkin P.S.

[57] ABSTRACT

A stroller includes a stroller frame with parallel front and rear horizontal rod members, and a seat member having a seat portion with a bottom side that is provided with a mounting unit for mounting detachably the seat member on the front and rear rod members. The mounting unit includes at least one hook unit for engaging one of the front and rear rod members, and a spring-loaded retaining device for engaging releasably the other one of the front and rear rod members.

8 Claims, 11 Drawing Sheets

५,७१८,४३९

STROLLER WITH DETACHABLE SEAT MEMBER

BACKGROUND OF THE INVENTION

1. Field of the Invention

The invention relates to a stroller, more particularly to a stroller with a detachable seat member.

2. Description of the Related Art

A conventional stroller includes a stroller frame and a seat member on the stroller frame. The stroller frame has a bottom end provided with casters, and includes a handle unit for pushing the stroller frame. Brake devices, direction guiding devices and devices for guarding against untimely folding of the strollers are usually installed to ensure safety of a child seated on the stroller.

The seat member may be formed as an integral part of the stroller frame. Alternatively, the seat member may be formed as a separate device which is mounted securely on the stroller frame. Thus, the seat member cannot be conveniently disassembled from the stroller frame of the conventional stroller for cleaning purposes.

Most strollers are seldom used when the wind is blowing in a direction facing the child on the conventional stroller to prevent the child from catching a cold. This is due to the drawback that the seat member cannot be turned relative to the stroller frame to shield the child from the wind since the seat member is mounted securely on the stroller frame. However, there is a stroller frame with a modified handle unit which can be pivoted so as to extend forwardly or rearwardly according to the wind direction in order to shield the child from the wind. Unfortunately, a change in the direction of the handle unit results in a change in the positions of the front and rear casters on the stroller frame. This results in ineffective operation of the direction guiding devices on the front casters and in inconvenient operation of the latch mechanisms on the rear casters.

In addition, it is noted that movement of the stroller along a rough surface can cause discomfort to the child on the stroller. Therefore, some strollers have front casters which incorporate a shock absorbing device to reduce the vibrations that result when the stroller is in motion. However, the vibrations experienced by the stroller do not come entirely from the front casters. Thus, the shock absorbing effect in such conventional strollers is severely limited.

SUMMARY OF THE INVENTION

Therefore, the object of the present invention is to provide a stroller with a detachable seat member which can be conveniently mounted on the stroller frame in either of two opposing directions.

Another object of the present invention is to provide a stroller with a shock absorbing device which mounts a seat member on a stroller frame so as to effectively absorb shock when the stroller is in motion.

According to the present invention, a stroller comprises a stroller frame with parallel front and rear horizontal rod members, and a seat member having a seat portion with a bottom side that is provided with a mounting unit for mounting detachably the seat member on the front and rear rod members. The mounting unit includes at least one hook unit for engaging one of the front and rear rod members, and a spring-loaded retaining device for engaging releasably the other one of the front and rear rod members.

The retaining device includes: a housing mounted on the bottom side of the seat portion of the seat member, the housing including a base plate and a surrounding wall which extends upwardly from the base plate and which cooperates with the base plate so as to confine a chamber, the surrounding wall having a front portion formed with a front notch, and a side portion formed with a side notch; a retaining block disposed in the chamber, the retaining block having a front portion which extends through the front notch in the surrounding wall and which has an upwardly curving bottom face and a top face formed with a widthwise extending groove for engaging the other one of the front and rear rod members, the retaining block further having a rear portion which is disposed in the chamber and which is formed with a sideward hook projection that extends toward the side notch in the surrounding wall, the hook projection having a first inclined face and a first shoulder on an innermost end of the first inclined face; a first spring member disposed in the chamber for biasing the retaining block outwardly of the chamber; a press piece disposed in the chamber, the press piece having an operating portion which extends through the side notch in the surrounding wall and an engaging portion which is formed with a second inclined face that abuts against the first inclined face and a second shoulder on an innermost end of the second inclined face for engaging the first shoulder; and a second spring member disposed in the chamber for biasing the press piece outwardly of the chamber.

When installing the seat member on the stroller frame, the other one of the front and rear rod members initially abuts against the bottom face of the front portion of the retaining block so that, when the seat member is pressed downwardly, the retaining block is pushed into the housing against biasing action of the first spring member until the other one of the front and rear rod members has moved past the bottom face so as to be retained within the groove in the top face of the front portion of the retaining block.

When detaching the seat member from the stroller frame, the press piece is pressed inwardly against biasing action of the second spring member so that the second inclined face moves along the first inclined face to result in movement of the retaining block inwardly of the housing against biasing action of the first spring member and in eventual engagement between the first and second shoulders such that the retaining block ceases to engage the other one of the front and rear rod members.

BRIEF DESCRIPTION OF THE DRAWINGS

Other features and advantages of the present invention will become apparent in the following detailed description of the preferred embodiments with reference to the accompanying drawings, of which.

DESCRIPTION OF THE PREFERRED EMBODIMENTS

Figure 1:
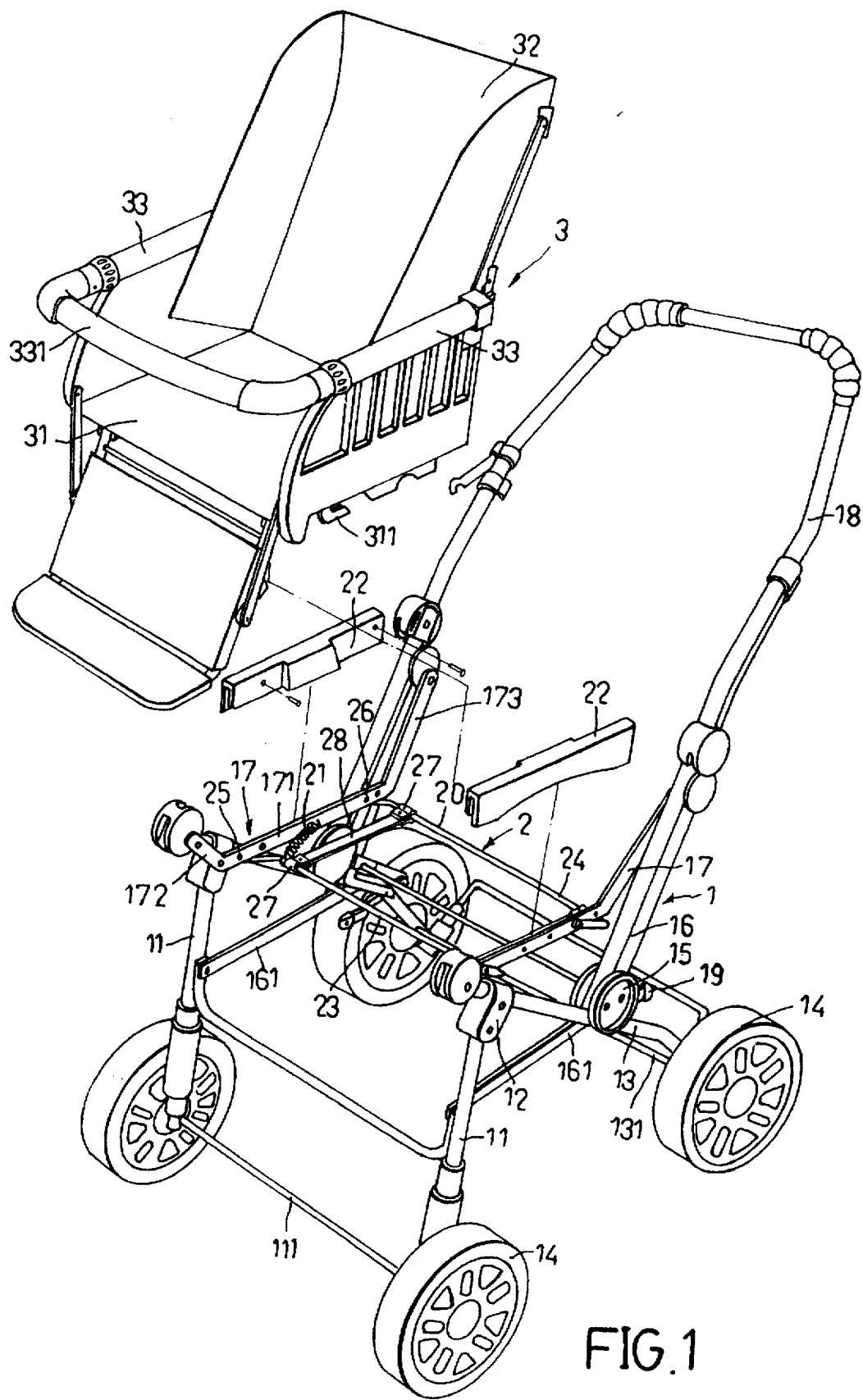
FIG. 1 is a partly exploded, perspective view of the first preferred embodiment of a stroller according to the present invention.

Before the present invention is described in greater detail, it should be noted that like elements are denoted by the same reference numerals throughout the disclosure.

Figure 2:
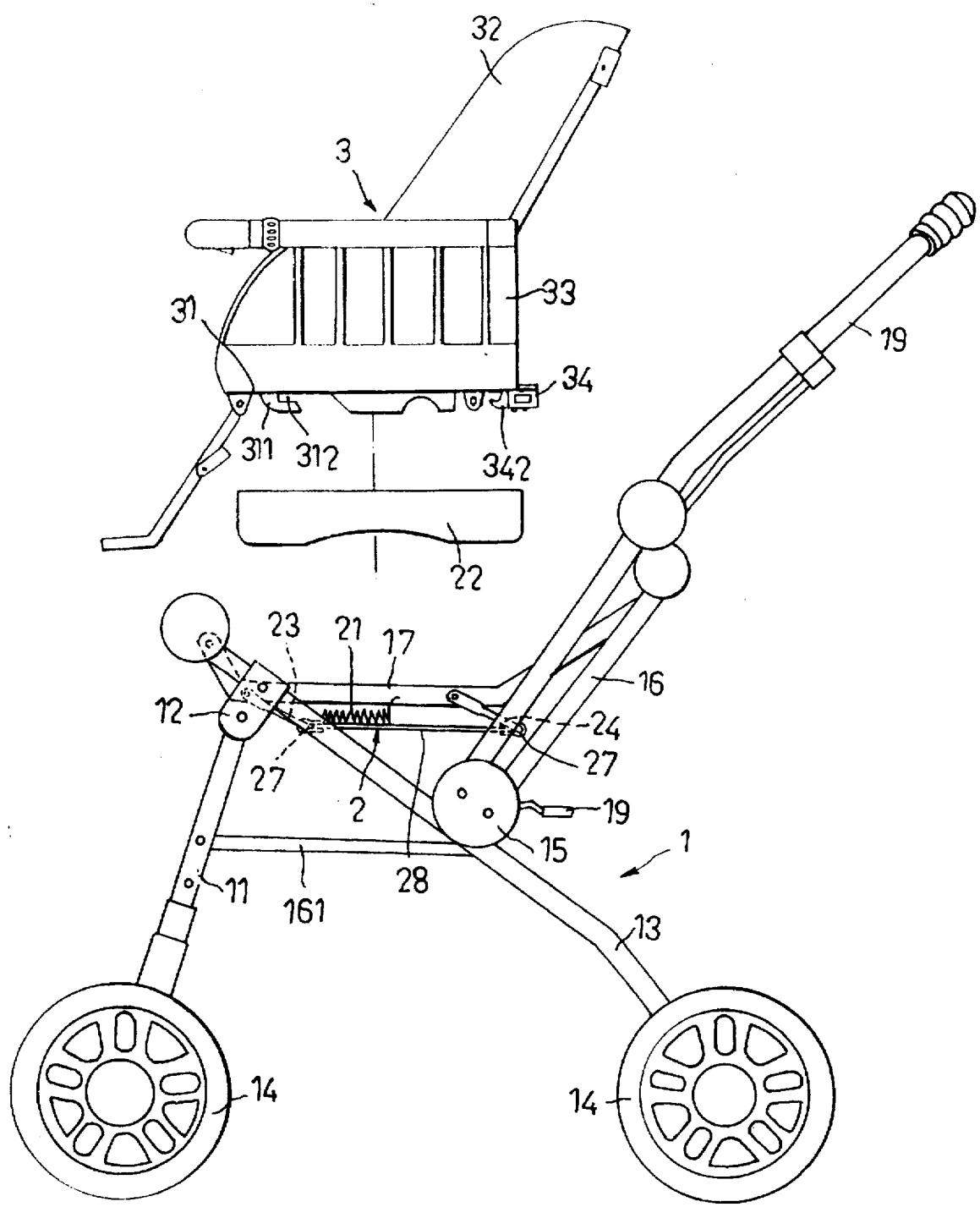
FIG. 2 is a partly exploded, schematic view of the first preferred embodiment.

Referring to FIGS. 1 and 2, the first preferred embodiment of a stroller according to the present invention is shown to comprise a stroller frame 1, a seat member 3, and a shock absorbing device 2 for mounting the seat member 3 on the stroller frame 1.

The stroller frame 1 is foldable and is generally similar to that disclosed in U.S. Pat. No. 5,417,450 by the applicant. The stroller frame 1 includes two front support members 11, two rear support members 13, and two connectors 12, each of which connects pivotally one of the front support members 11 to one of the rear support members 13. Front and rear axles 111, 131 extend between the front and rear support members 11, 13, respectively. A caster 14 is mounted rotatably on each end of the front and rear axles 111, 131. Each of two pivot shafts 16 has a bottom end provided with a slide piece 15 which straddles a respective one of the rear support members 13. Each of two horizontal linking plates 17 has a first end connected to one of the pivot shafts 16 and a second end connected to the top end of one of the rear support members 13. The seat member 3 is to be disposed between the linking plates 17. Each of two connecting plates 161 has a first end connected to one of the front support members 13 and a second end connected to one of the pivot shafts 16. Each of the linking plates 17 has a horizontal portion 171 which extends between the rear support member 13 and the pivot shaft 16, a forwardly and upwardly inclining portion 172 which extends from a front end of the horizontal portion 171 and which is connected pivotally to the rear support member 13, and a rearwardly and upwardly inclining portion 173 which extends from a rear end of the horizontal portion 171 and which is connected pivotally to the pivot shaft 16. The stroller frame 1 further includes a handle unit 18 with lower end portions connected pivotally and respectively to the slide pieces 15. A catch mechanism 19, similar to that employed in the aforementioned U.S. Pat. No. 5,417,450, is installed to retain releasably the stroller frame 1 in an unfolded position, thereby avoiding accidental folding of the stroller frame 1.

Figure 3:
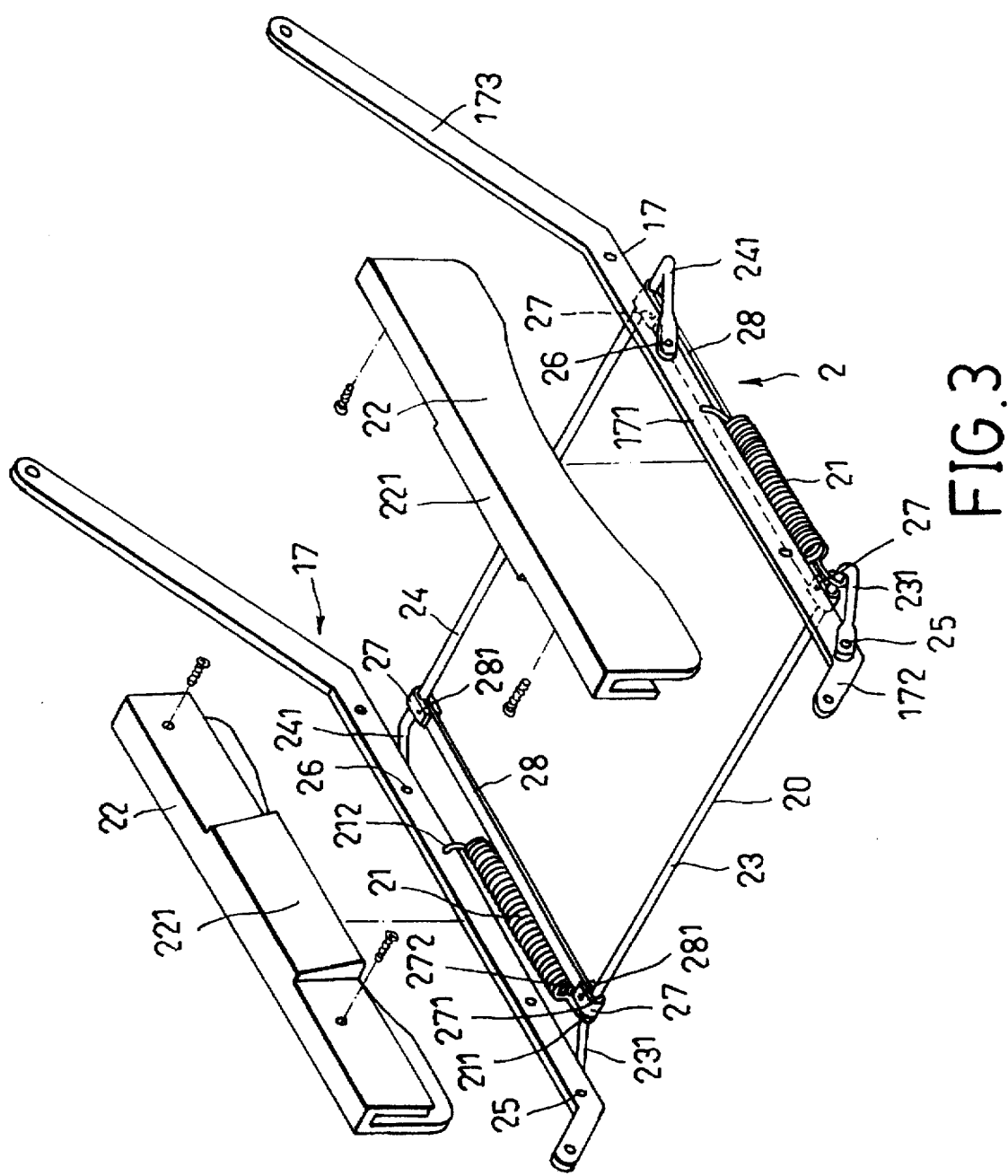
FIG. 3 is a perspective view of a shock absorbing device of the first preferred embodiment.

As shown in FIG. 3, the shock absorbing device 2 is disposed between the linking plates 17 and includes a frame unit 20, a spring unit constituted by two springs 21, and two cover pieces 22.

The frame unit 20 includes parallel front and rear rod members 23, 24 which extend between and which are transverse to the linking plates 17. The front rod member 23 has a pair of bent leg portions 231, each of which is connected pivotally to a front part of the horizontal portion 171 of a respective one of the linking plates 17 by means of a corresponding rivet 25. The rear rod member 24 has a pair of bent leg portions 241, each of which is connected pivotally to a rear part of the horizontal portion 171 of a respective one of the linking plates 17 by means of a corresponding rivet 26. The frame unit 20 further includes two side plate members 28, each of which has two ends provided with a respective connector 27 for connection with one of the front and rear rod members 23, 24. Each connector 27 has a sleeve portion 271 to be sleeved on the corresponding one of the front and rear rod members 23, 24 and is formed with a slot 272 for receiving one end of the respective one of side plate members 28. Pins 281 secure the connectors 27 onto the side plate members 28.

Each of the springs 21 has a first hook end portion 211 which engages the front rod member 23 and a second hook end portion 212 which engages an intermediate part of the horizontal portion 171 of a respective one of the linking plates 17. Each of the cover pieces 22 covers a respective one of the linking plates 17 and has an inner side formed with a projection 221 that rests on top of an adjacent one of the side plate members 28. When installed, the frame unit 20 is swingable relative to the linking plates 17 in a first direction, wherein the frame unit 20 swings downwardly and forwardly, and a second direction, wherein the frame unit 20 swings upwardly and rearwardly.

Referring to FIGS. 1 to 4, the seat member 3 is installed on the frame unit 20 of the shock absorbing device 2. The seat member 3 has a seat portion 31, a backrest portion 32 connected pivotally to a rear end of the seat portion 31, and a pair of armrests 33 disposed respectively on opposite sides of the seat portion 31. A guard rail 331 has two ends connected to front ends of the armrests 33 for safety purposes. The seat portion 31 has a bottom side with a front part which is provided with a pair of hook units 311 (only one is shown). Each hook unit 311 has a slit 312 for engaging one of the front and rear rod members 23, 24. The bottom side of the seat portion 31 further has a rear part provided with a spring-loaded retaining device 34 for engaging the other one of the front and rear rod members 23, 24. The hook units 311 and the retaining device 34 constitute a mounting unit for mounting detachably the seat member 3 on the frame unit 20.

Figure 5:
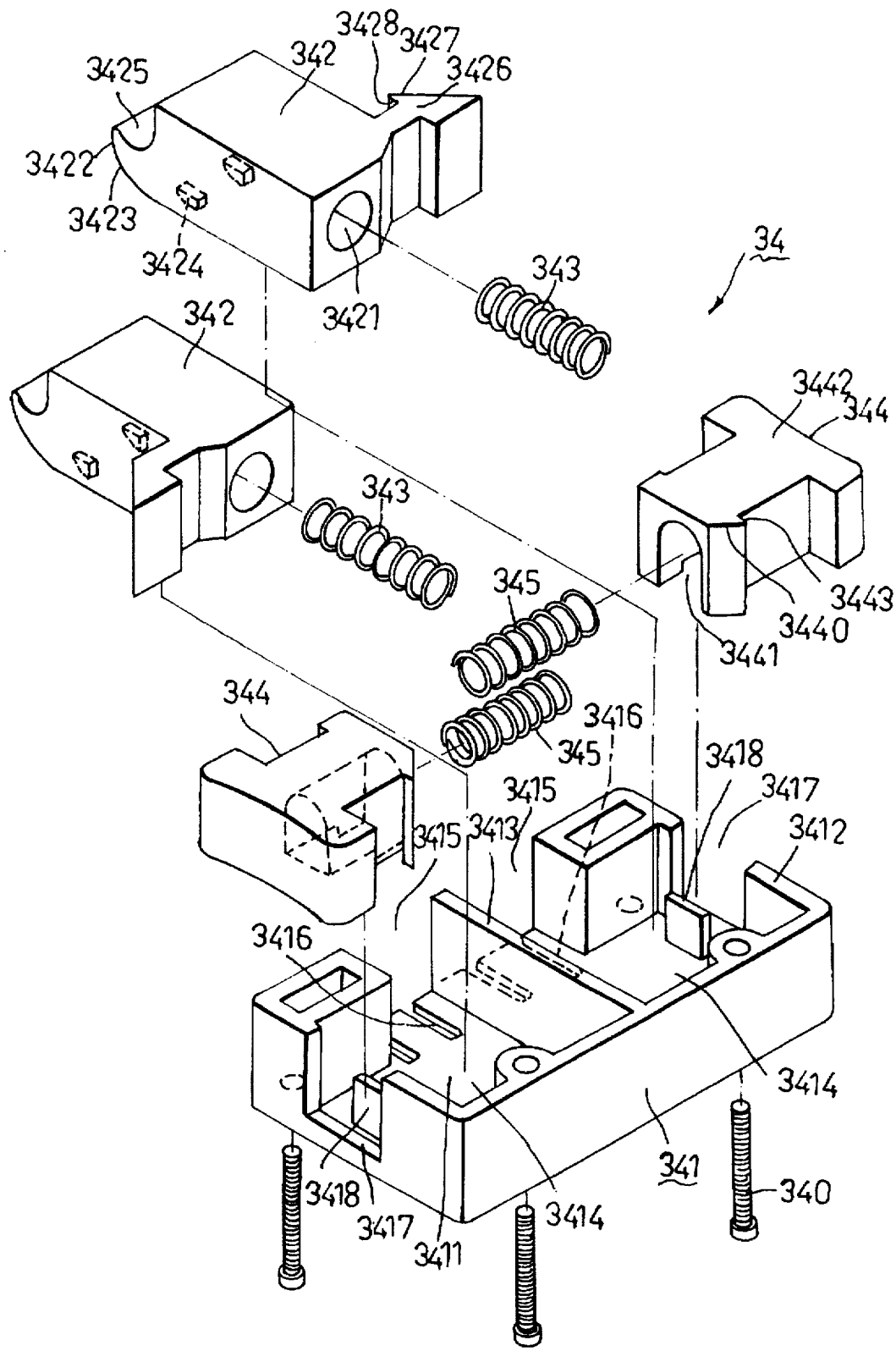
FIG. 5 is an exploded view of a spring-loaded retaining device of the first preferred embodiment.

Referring to FIG. 5, the retaining device 34 includes a housing 341 which is mounted on the rear part of the bottom side of the seat portion 31 by means of bolts 340. The housing 341 includes a rectangular base plate 3411, a surrounding wall 3412 which extends upwardly from a periphery of the base plate 3411, and a transverse partition wall 3413 which extends between front and rear portions of the surrounding wall 3412 so as to divide the space cooperatively confined by the base plate 3411 and the surrounding wall 3412 into left and right chambers 3414. Each of a pair of retaining blocks 342 is disposed in a respective one of the chambers 3414. Each of the chambers 3414 further has a first spring member 343, a press piece 344 and a second spring member 345 disposed therein.

The front portion of the surrounding wall 3412 is formed with a pair of front notches 3415 on two sides of the partition plate 3413. The base plate 3411 is formed with two pairs of slits 3416 which are parallel to and which are disposed on two sides of the partition plate 3413. Each of the slits 3416 extends rearwardly from the respective one of the front notches 3415. The surrounding wall 3412 further has opposite side portions which are respectively formed with a side notch 3417. The base plate 3411 is further formed with a pair of upwardly extending contact plates 3418, each of which is disposed adjacent to a respective one of the side notches 3417 in the surrounding wall 3412.

Each of the retaining blocks 342 has a rear portion which is formed with a blind bore 3421 and a front portion 3422 which extends through a respective one of the front notches 3415 in the surrounding wall 3412 and which has an upwardly curving bottom face 3423. Each of the retaining blocks 342 is further formed with a pair of guide projections 3424 which slidably engage a respective pair of slits 3416 in the base plate 3411. The front portion 3422 of each of the retaining blocks 342 has a top face formed with a widthwise extending groove 3425 for engaging the other one of the front and rear rod members 23, 24.

The rear portion of each of the retaining blocks 342 is further formed with a sideward hook projection 3426 that extends toward an adjacent one of the side notches 3417 in the surrounding wall 3412. The hook projection 3426 has a first inclined face 3427 and a first shoulder 3428 on an innermost end of the first inclined face 3427.

Each first spring member 343 has a first end portion which extends into the blind bore 3421 in a respective one of the retaining blocks 342, and a second end portion which abuts against the rear portion of the surrounding wall 3412.

Each press piece 344 has an engaging portion adjacent to a respective one of the contact plates 3418 and formed with a blind bore 3441. Each second spring member 345 has a first end portion which abuts against a respective one of the contact plates 3418 and a second end portion which extends into the blind bore 3441 of a respective one of the press pieces 344. Each press piece 344 further has an operating portion 3442 wider than and opposite to the engaging portion thereof. The engaging portion of each press piece 344 is formed with a second inclined face 3440 that abuts against the first inclined face 3427 of the hook projection 3426 on the respective one of the retaining blocks 342 and a second shoulder 3443 on an innermost end of the second inclined face 3440 for engaging the first shoulder 3428 of the hook projection 3426.

Figure 4:
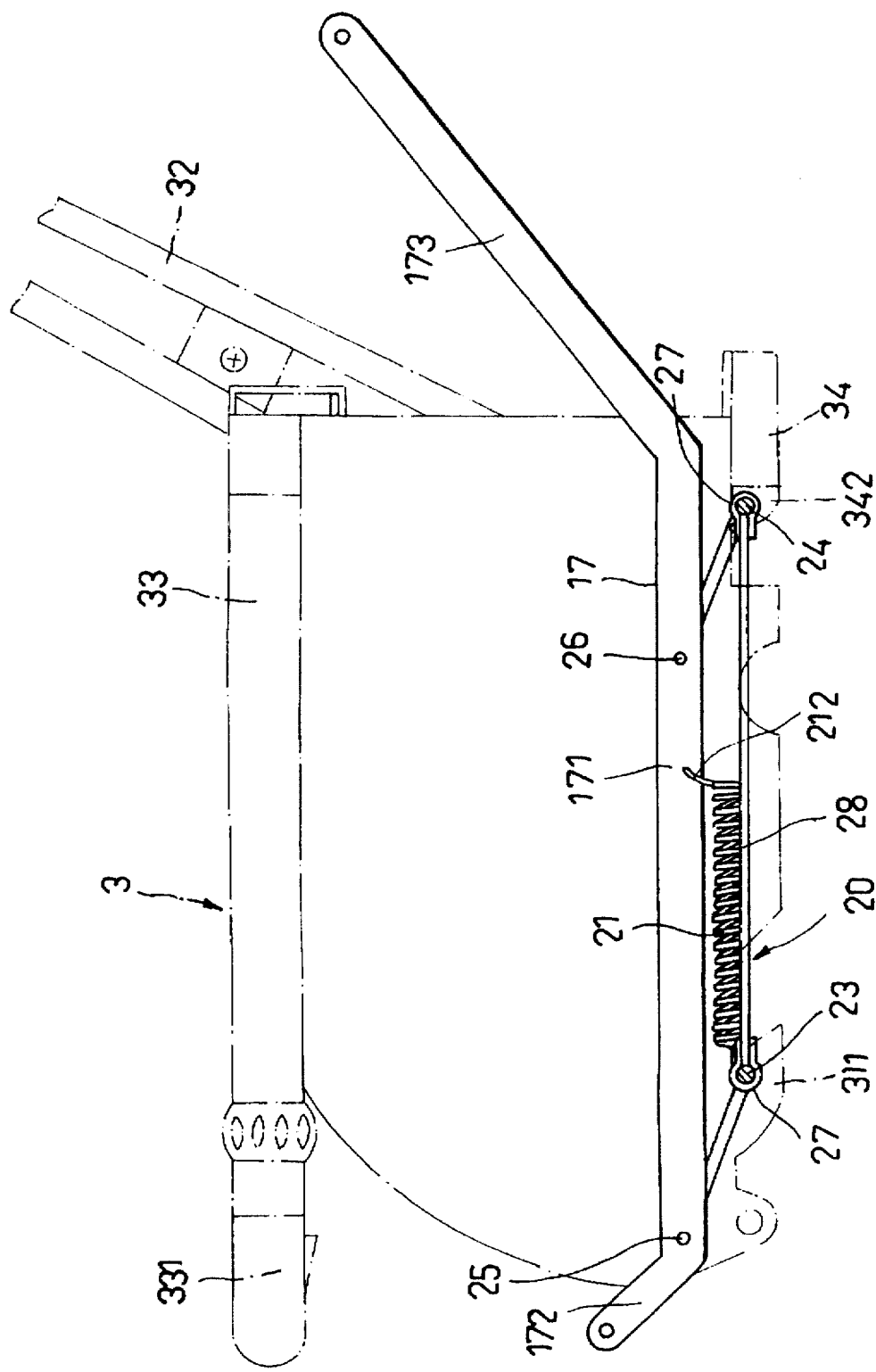
FIG. 4 is a schematic view which illustrates the assembly of the shock absorbing device.
Figure 6:
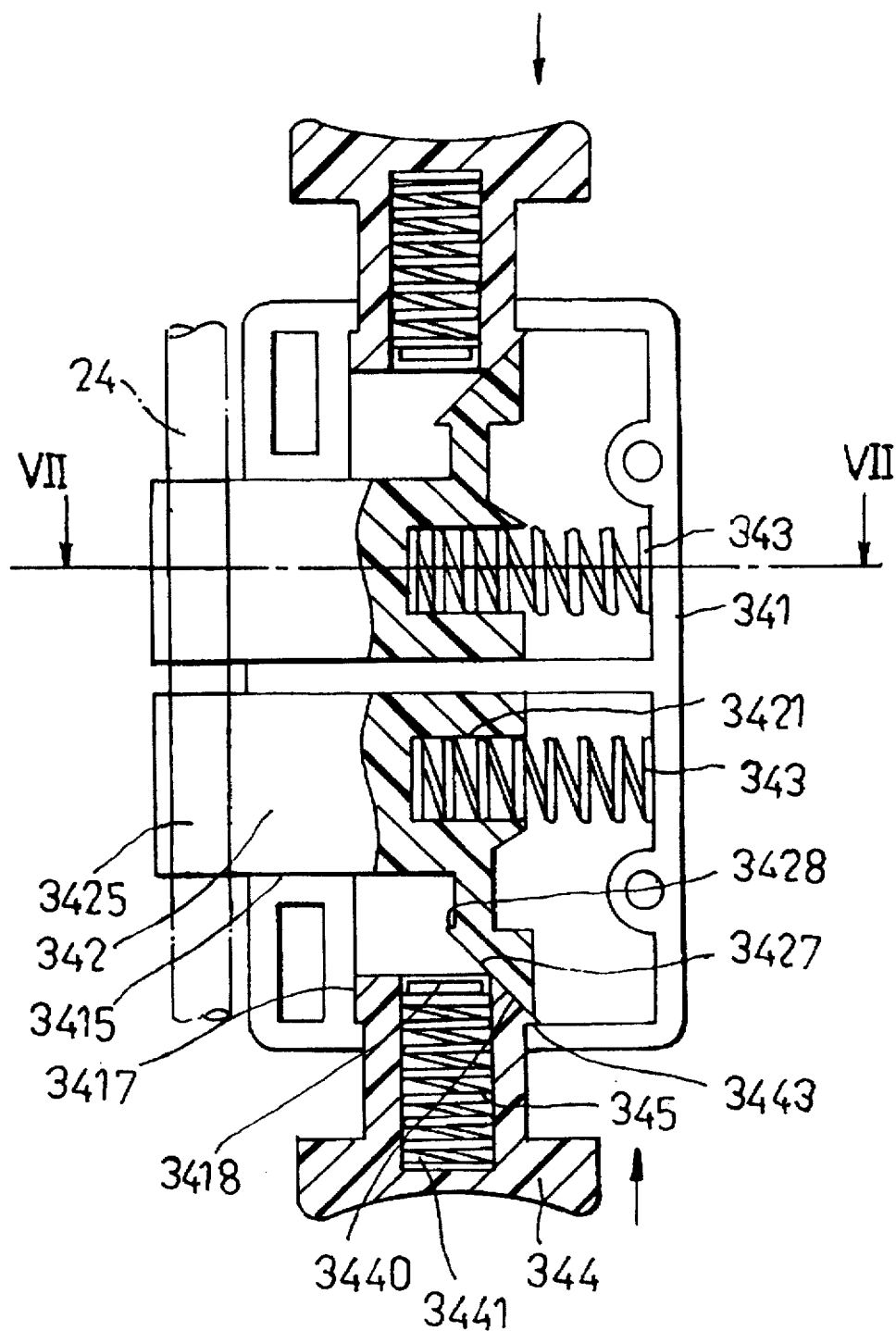
FIG. 6 is a partly sectional, schematic view of the retaining device when in an engaging state.

Referring to FIGS. 4 and 6, when installing the seat member 3 in a first direction, the seat member 3 is provided on top of the frame unit 20 of the shock absorbing device 2 and is pulled rearwardly such that the hook units 311 engage the front rod member 23. The seat member 3 is then pressed downwardly to enable the retaining device 34 to engage releasably the rear rod member 24, thereby mounting the seat member 3 on the stroller frame 1.

Figure 7:
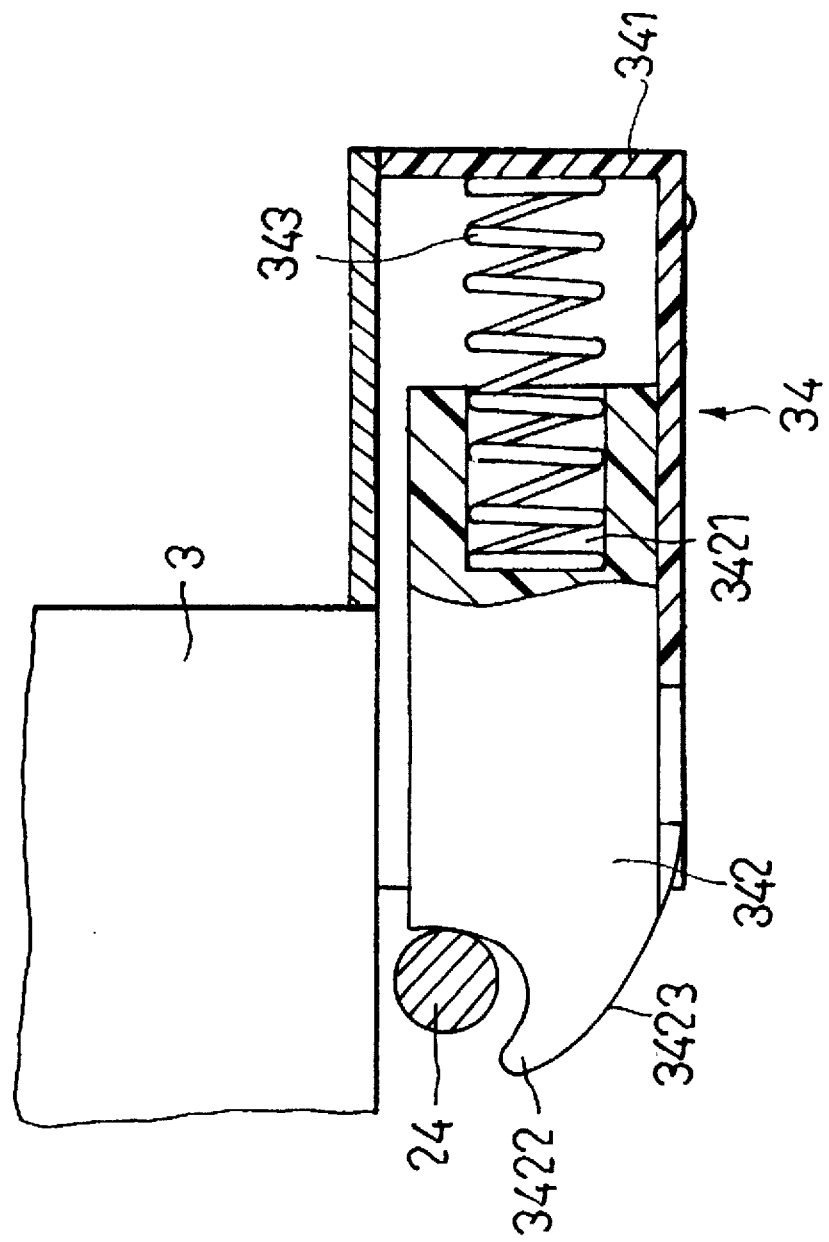
FIG. 7 is a partly sectional, schematic view of the retaining device, taken along line VII—VII in FIG. 6.

As shown in FIGS. 4, 6 and 7, when the seat member 3 is disposed on the frame unit 20, the rear rod member 24 initially abuts against the bottom faces 3423 of the front portions 3422 of the retaining blocks 342. Thus, when the seat member 3 is pressed downwardly, the rear rod member 24 moves along the bottom faces 3423 and pushes the retaining blocks 342 into the housing 341 against biasing action of the first spring members 343. Once the rear rod member 24 has moved past the bottom faces 3423, the first spring members 343 expand such that the rear rod member 24 is retained within the grooves 3425 in the top faces of the front portions 3422 of the retaining blocks 342.

Figure 9:
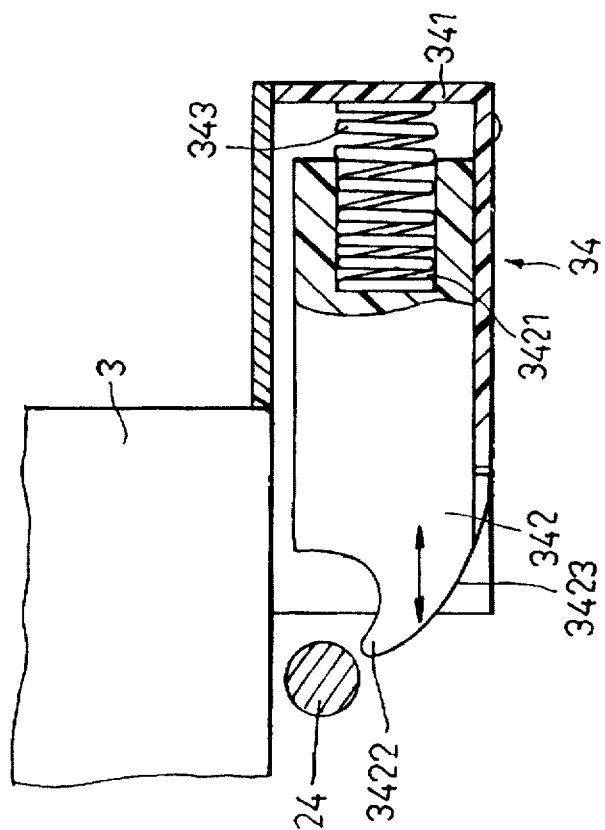
FIG. 9 is a partly sectional, schematic view of the retaining device, taken along line IX—IX in FIG. 8.
Figure 8:
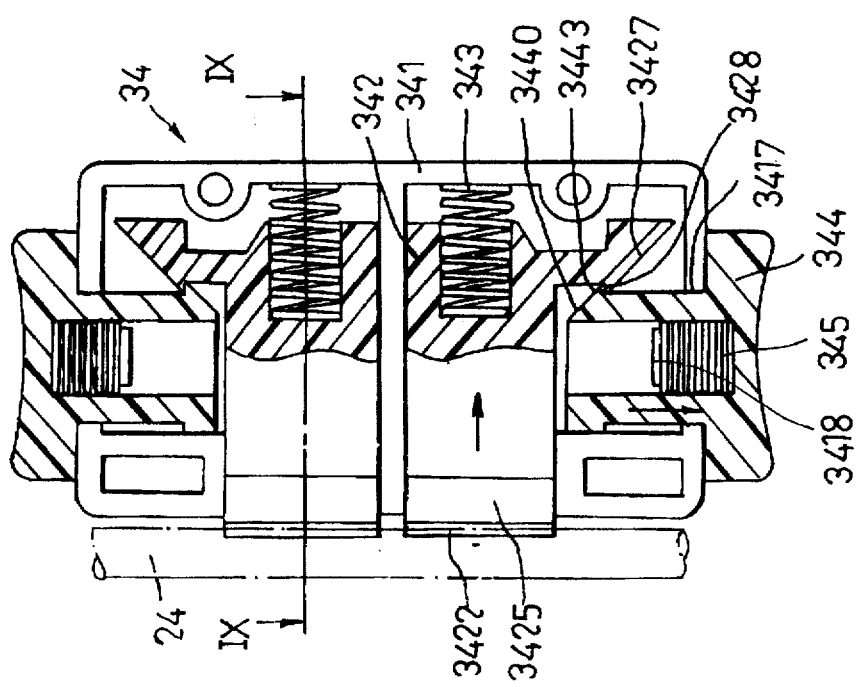
FIG. 8 is a partly sectional, schematic view of the retaining device when in a disengaging state.

Referring to FIGS. 6, 8 and 9, when it is desired to detach the seat member 3 from the stroller frame 1, the press pieces 344 are pressed inwardly against biasing action of the second spring members 345. At this time, the second inclined faces 3440 on the press pieces 344 move along the first inclined faces 3427 of the hook projections 3426 on the retaining blocks 342, thereby resulting in movement of the retaining blocks 342 inwardly of the housing 341 against the biasing action of the first spring members 343. The second shoulders 3443 on the press pieces 344 eventually engage the first shoulders 3428 of the hook projections 3426, and the retaining blocks 342 cease to engage the rear rod member 24. The seat member 3 can be lifted from the frame unit 20 at this time. When the seat member 3 is lifted from the frame unit 20, the rear rod member 24 once again abuts against the bottom faces 3423 of the front portions 3422 of the retaining blocks 342 and pushes the retaining blocks 342 further into the housing 341 against the biasing action of the first spring members 343. The second shoulders 3443 disengage the first shoulders 3428, thereby permitting expansion of the second spring members 345 to return the press pieces 344 to their normal positions. When the rear rod member 24 ceases to abut against the bottom faces 3423, the first spring members 343 expand to return the retaining blocks 342 to their normal positions, i.e. from the positions in FIG. 8 to the positions in FIG. 6. At this time, the seat member 3 can be mounted on the stroller frame 1 in an opposite direction, wherein the hook units 311 engage the rear rod member 24 while the retaining device 34 engages releasably the front rod member 23. The steps for mounting the seat member 3 on the stroller frame 1 in the opposite direction are similar to those described beforehand and will not be repeated herein.

Figure 10:
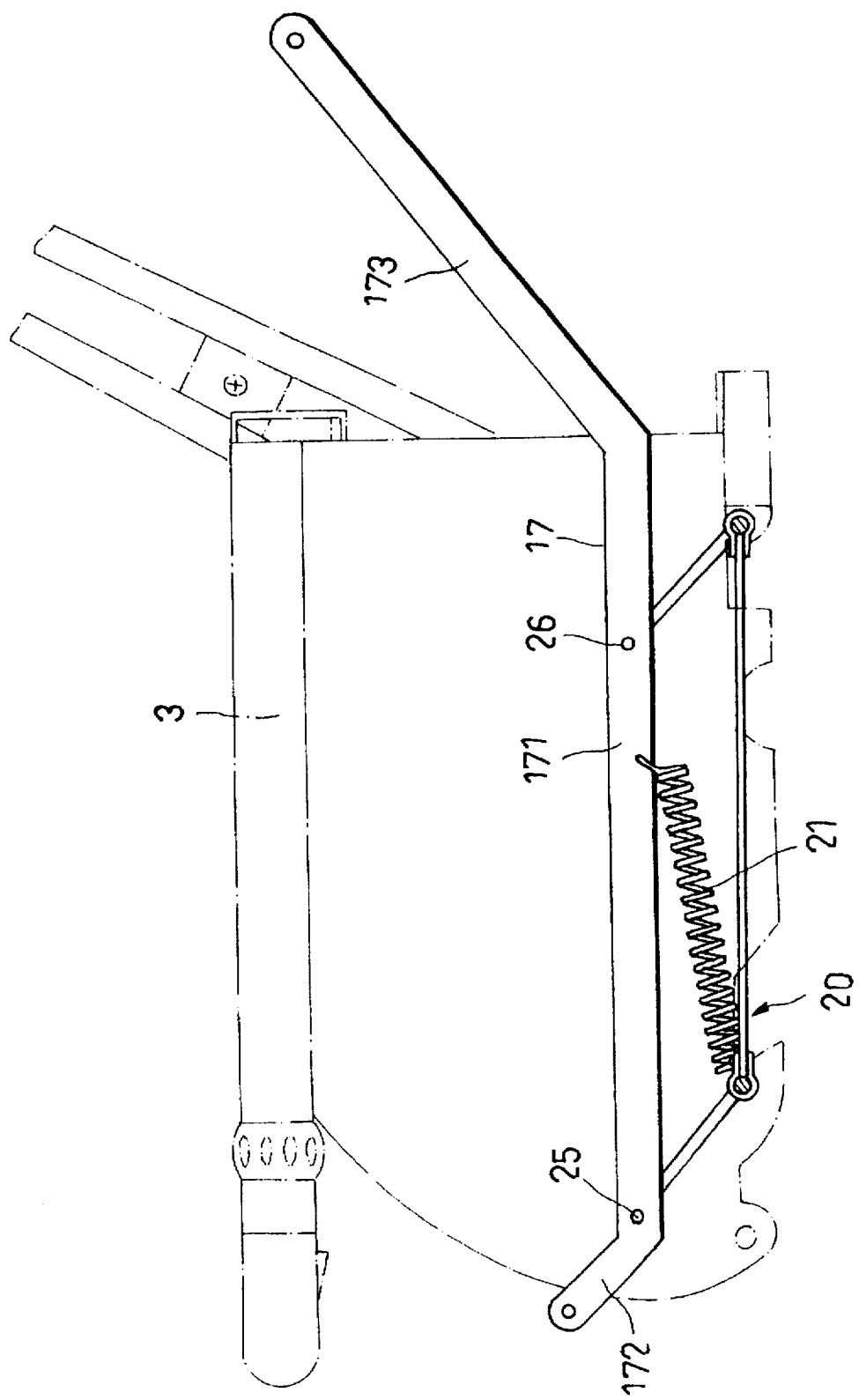
FIG. 10 is a schematic view which illustrates the operation of the shock absorbing device when the stroller is in motion.

Referring once more to FIG. 4, when a child is not seated on the seat member 3, the springs 21 bias the frame unit 20 in the second direction, i.e. the frame unit 20 swings upwardly and rearwardly. As shown in FIG. 10, when a child is seated on the seat member 3 and the stroller moves along a rough surface, the shock experienced by the stroller frame 1 results in swinging of the frame unit 20 about the rivets 25, 26 in the first direction. Since the springs 21 provide resistance to swinging of the frame unit 20, the shock that is transmitted to the seat member 3 by the stroller frame 1 can be minimized.

Figure 11:
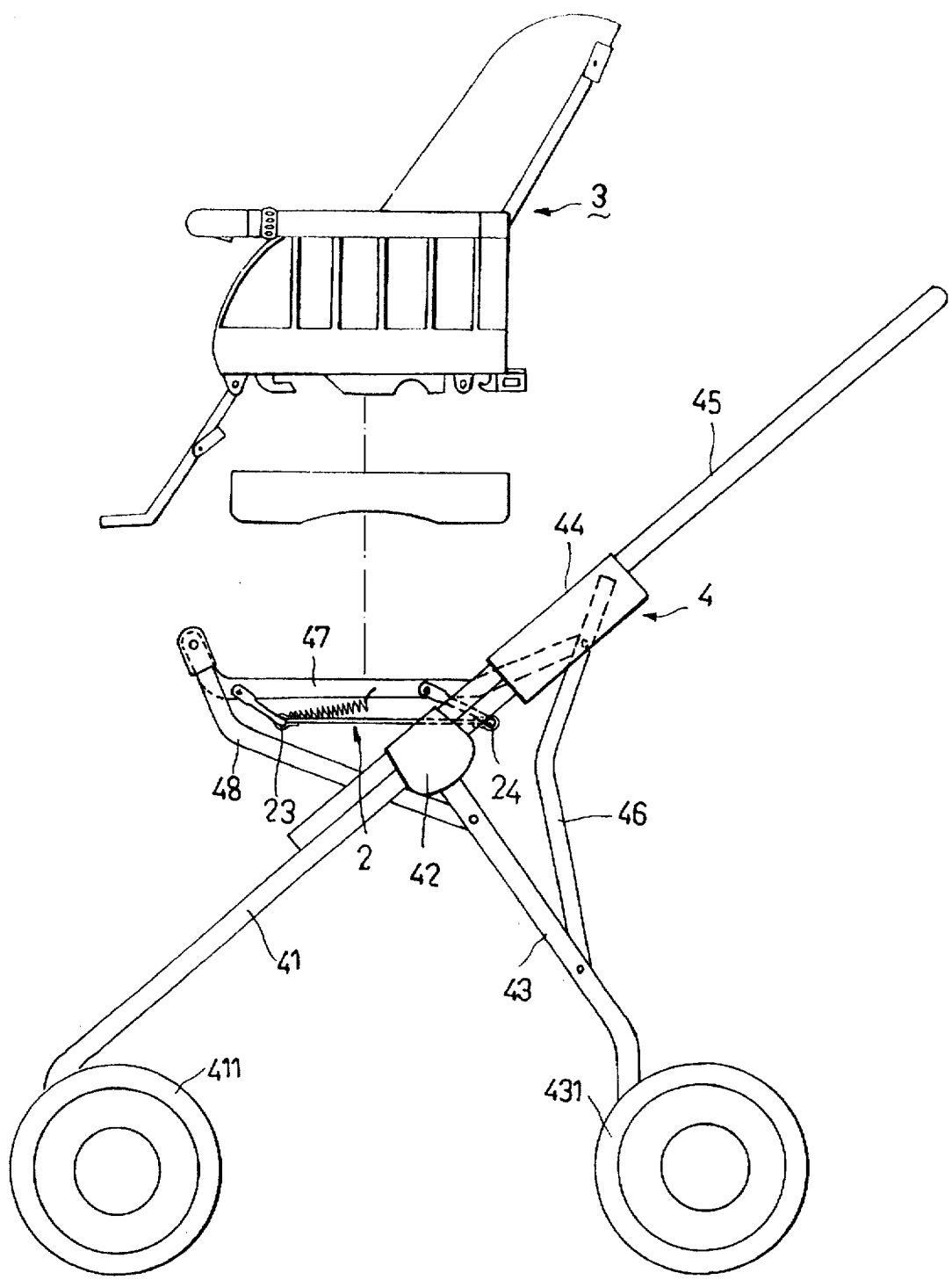
FIG. 11 is a schematic view of the second preferred embodiment of a stroller according to the present invention.

FIG. 11 illustrates the second preferred embodiment of a stroller according to the present invention. The second preferred embodiment is generally similar to the first preferred embodiment, the main difference residing in the configuration of the stroller frame 4. The stroller frame 4 includes two front support members 41, two rear support members 43, and two connectors 42, each of which connects pivotally one of the front support members 41 to one of the rear support members 43. Front and rear casters 411, 431 are mounted rotatably on bottom ends of the front and rear support members 41, 43, respectively. The two ends of a handle unit 45 are mounted on connecting seats 44 which are respectively provided at the top end of each of the front support members 41. Each of a pair of rear linking rods 46 interconnects one of the connecting seats 44 and one of the rear support members 43. Each of a pair of front linking rods 48 has a first end connected pivotally to a respective one of the rear support members 43. Each of a pair of linking plates 47 connects pivotally one of the connecting seats 44 and a second end of one of the front linking rods 48. Installation of the shock absorbing device 2 on the linking plates 47, and of the seat member 3 on the shock absorbing device 2 are similar to those of the first preferred embodiment and will not be described further.

Figure 12:
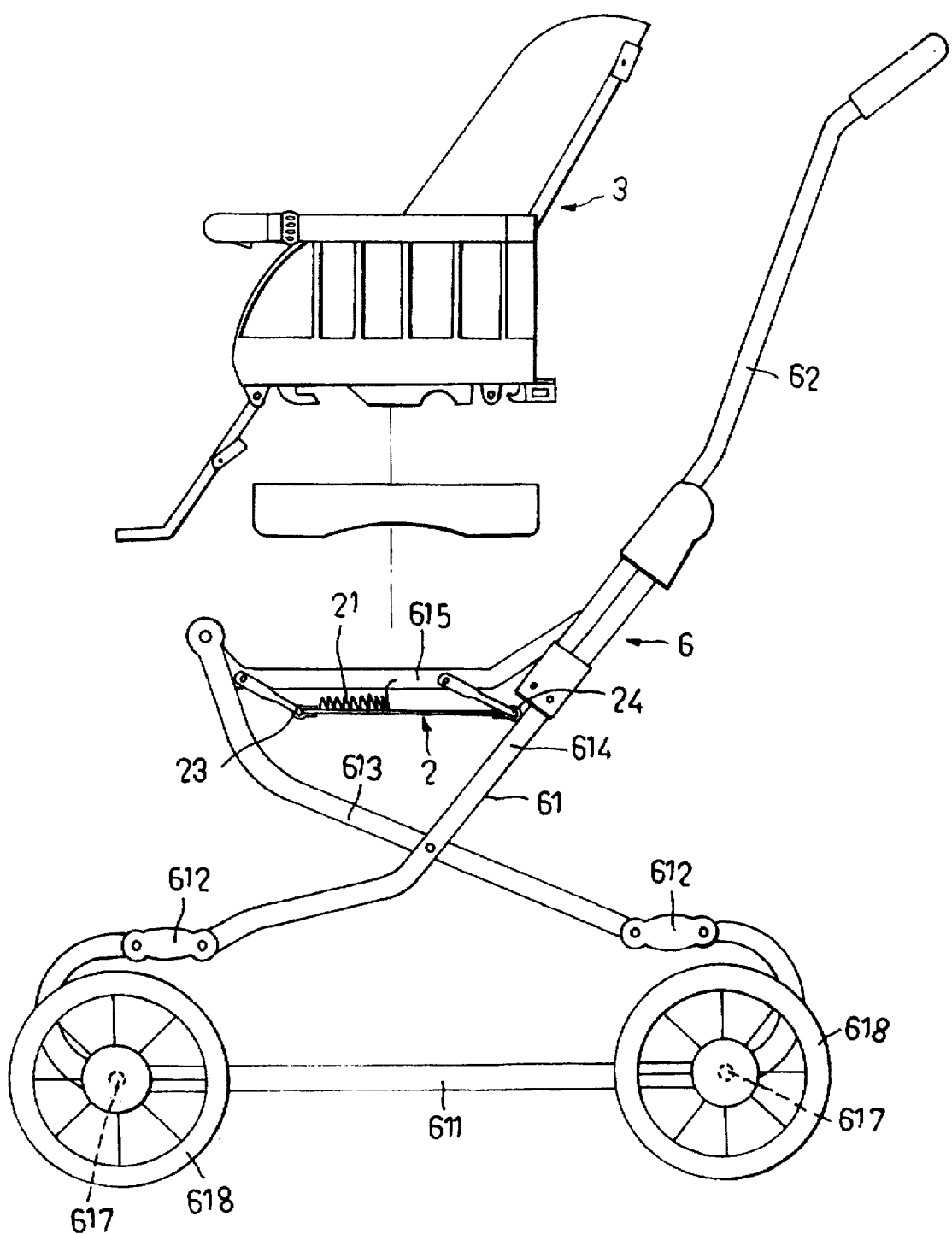
FIG. 12 is a schematic view of the third preferred embodiment of a stroller according to the present invention.

FIG. 12 illustrates the third preferred embodiment of a stroller according to the present invention. The third preferred embodiment is generally similar to the previous embodiments, the main difference residing in the configuration of the stroller frame 6. The stroller frame 6 includes left and right frame parts 61 and a handle unit 62. Each of the frame parts 61 includes a base frame member 611, a pair of connectors 612 provided respectively on upwardly curving ends of the base frame member 611, and forwardly and rearwardly extending frame members 613, 614 connected pivotally at intermediate portions thereof. Each of the frame members 613, 614 has a lower end connected pivotally to one of the connectors 612. A linking plate 615 has two ends connected pivotally to upper ends of the frame members 613, 614. The handle unit 62 is connected to the upper ends of the rearwardly extending frame members 614 of the frame parts 61. Front and rear axles 617 interconnect the base frame members 611 of the left and right frame parts 61. A caster 618 is mounted rotatably on each end of the axles 617. Installation of the shock absorbing device 2 on the linking plates 615, and of the seat member 3 on the shock absorbing device 2 are similar to those of the first preferred embodiment and will not be described further.

Note that the specific configuration of the stroller frame is not critical to the present invention. The shock absorbing device 2 can be used with any stroller frame, as long as there are two linking plates on opposite sides of the seat member. In addition, although the retaining device 34 in the disclosed embodiments includes a pair of retaining blocks 342, a pair of press pieces 344, a pair of first spring members 343 and a pair of second spring members 345, a retaining device with only one retaining block, one press piece, one first spring member and one second spring member may be used to achieve the same purpose.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:
1. A stroller, comprising:
a stroller frame with parallel front and rear horizontal rod members; and
a seat member having a seat portion with a bottom side that is provided with a mounting unit for mounting detachably said seat member on said front and rear rod members, said mounting unit including at least one hook unit for engaging one of said front and rear rod members, and a spring-loaded retaining device for engaging releasably the other one of said front and rear rod members, said retaining device including:
a housing mounted on said bottom side of said seat portion of said seat member, said housing including a base plate and a surrounding wall which extends upwardly from said base plate and which cooperates with said base plate so as to confine a chamber, said surrounding wall having a front portion formed with a front notch, and a side portion formed with a side notch;
a retaining block disposed in said chamber, said retaining block having a front portion which extends through said front notch in said surrounding wall and which has an upwardly curving bottom face and a top face formed with a widthwise extending groove for engaging the other one of said front and rear rod members, said retaining block further having a rear portion which is disposed in said chamber and which is formed with a sideward hook projection that extends toward said side notch in said surrounding wall, said hook projection having a first inclined face and a first shoulder on an innermost end of said first inclined face;

a first spring member disposed in said chamber for biasing said retaining block outwardly of said chamber;
a press piece disposed in said chamber, said press piece having an operating portion which extends through said side notch in said surrounding wall and an engaging portion which is formed with a second inclined face that abuts against said first inclined face and a second shoulder on an innermost end of said second inclined face for engaging said first shoulder; and
a second spring member disposed in said chamber for biasing said press piece outwardly of said chamber;
whereby, when installing said seat member on said stroller frame, the other one of said front and rear rod members initially abuts against said bottom face of said front portion of said retaining block so that, when said seat member is pressed downwardly, said retaining block is pushed into said housing against biasing action of said first spring member until the other one of said front and rear rod members has moved past said bottom face so as to be retained within said groove in said top face of said front portion of said retaining block; and
when detaching said seat member from said stroller frame, said press piece is pressed inwardly against biasing action of said second spring member so that said second inclined face moves along said first inclined face to result in movement of said retaining block inwardly of said housing against biasing action of said first spring member and in eventual engagement between said first and second shoulders such that said retaining block ceases to engage the other one of the front and rear rod members.

2. The stroller as claimed in claim 1, wherein said base plate is formed with a slit which extends rearwardly from said front notch, said retaining block being formed with a guide projection which slidably engages said slit in said base plate.

3. The stroller as claimed in claim 1, wherein said rear portion of said retaining block is formed with a blind bore, said first spring member having a first end portion which extends into said blind bore in said retaining block and a second end portion which abuts against a rear portion of said surrounding wall.

4. The stroller as claimed in claim 1, wherein said base plate is further formed with an upwardly extending contact plate disposed adjacent to said side notch in said surrounding wall, said engaging portion of said press piece being formed with a blind bore, said second spring member having a first end portion which abuts against said contact plate and a second end portion which extends into said blind bore in said press piece.

5. The stroller as claimed in claim 1, wherein said stroller frame has a pair of horizontal linking plates on two sides of said seat member, and a shock absorbing device which includes a frame unit disposed between said linking plates and mounted swingably on said linking plates, said frame unit being movable relative to said linking plates in a first direction, wherein said frame unit swings forwardly add downwardly, and in a second direction, wherein said frame unit swings rearwardly and upwardly, said frame unit including said front and rear rod members which extend between said linking plates, each of said front and rear rod members having a pair of bent leg portions connected pivotally and respectively to said linking plates, said frame unit further including two side plate members, each of which has two ends connected respectively to said front and rear rod members, said shock absorbing device further including a spring unit interconnecting said frame unit and said linking plates and biasing said frame unit in said second direction.

6. The stroller as claimed in claim 5, wherein said spring unit includes two extension springs, each of which has a first end connected to a respective one of said linking plates and a second end connected to said front rod member.

7. The stroller as claimed in claim 5, further comprising a pair of cover pieces, each of which covers a respective one of said linking plates.

8. The stroller as claimed in claim 7, wherein each of said cover pieces has an inner side formed with a projection that rests on top of an adjacent one of said side plate members.

* * * * *